Patented Sept. 5, 1944

2,357,497

UNITED STATES PATENT OFFICE 2,357,497

DRILLING MUD

Donald C. Bond, Northbrook, Ill., assignor to The Pure Oil Company, Chicago, Ill., a corporation of Ohio No Drawing. Application June 4, 1943, Serial No. 489,701

14 Claims. (Cl. 252—8.5)

This invention relates to drilling wells and is primarily concerned with the production of an improved drilling mud and composition for preparation thereof for use in the drilling of wells, especially oil and gas wells, and with the method of drilling wells wherein such muds are used. This application is a continuation-in-part of my co-pending application, Serial No. 303,024, filed November 6, 1939, entitled Improved drilling mud.

Drilling operations are usually conducted in the presence of a circulation of mud, that is, water containing mineral matter such as clay in a finely divided or deflocculated state. Such drilling muds are used in almost all rotary drilling operations for deep wells for oil and gas and simultaneously serve several functions. The mud is used primarily to carry the cuttings from the hole and to lubricate the drill bit, and in addition provides a lining or sheath on the walls of the drill hole to prevent either flow of water or gas from the sub-surface formation into the drill hole or to prevent loss of drilling fluid from the hole into the formations through which the hole is drilled. These muds are frequently made from material native to the formation in which the well is drilled, although it is often necessary to add additional material to the mud which will increase the specific gravity in order to increase the weight of the column of mud in the well and thereby offset the effect of high gas pressure. For this purpose weighting materials such as iron oxide and barytes are commonly used. Every natural clay contains particles of many orders of magnitude, some being coarse enough to settle out of a water suspension quickly and others being fine enough to stay suspended for indefinite periods. In a clay that is considered good for drilling purposes the fine material is predominant and is in an indefinitely fine state of subdivision, the finest being so small that much or most of it can be said to be in the form of a colloidal suspension or dispersion when the clay has been mixed with water. The suspended particles obey the genral rules of colloidal dispersions, the degree of dispersion being increased by some ions and chemicals and being decreased by others. An increase in the degree of dispersion is termed "deflocculation" and a decrease in the state of dispersion is termed "flocculation." Flocculated clay may be in an equally finely divided state to that of deflocculated clay but the flocculated material will come together in flocculent, loose clumps or aggregates which settle readily from the medium in which it is dispersed, which in the case of drilling muds, is generally water. The stability of colloidal dispersions is also directly related to the charges on the dispersed particles. In general it may be said that strongly charged negative or positive particles form stable dispersions, whereas weakly charged or neutral particles tend to flocculate and settle out of the disperse medium.

When drilling in some formations such as, for example, certain shale formations, considerable difficulty has been experienced due to the property of these shale formations of swelling and sloughing when contacted with water or ordinary drilling mud. This property of some formations to hydrate or absorb water and swell sometimes occurs to such an extent that the holes cave and fill to such a degree that in the end the drilling has to be abandoned. Formations which have this property of absorbing water and swelling are, in the well drilling art, generally termed "heaving-shale" formations and it is with these types of formations that this invention is particularly concerned.

It is an object of this invention to provide an improved composition useful in the preparation of drilling mud.

It is another object of this invention to provide an improved drilling mud which will prevent the heaving of heaving-shale formations.

It is a still further object of this invention to provide a drilling mud in which the colloidal mineral content is dispersed as positively charged particles.

A further object of this invention is to provide an improved method for drilling in heaving-shale formations.

Various other objects and advantages will appear as the description of the invention proceeds.

Colloidally dispersed clay, obeying the general rules of colloidal dispersions, carries an electrical charge. Practically all naturally occurring finely divided clays such as kaolin and bentonite carry negative charges on the dispersed particles when dispersed in an aqueous medium. It is known that the shale in heaving-shale formation is generally bentonitic in character and that upon being dispersed in water carries a negative charge. It has now been found that if the colloidally dispersed particles, generally clay, in drilling muds are positively instead of negatively charged, the swelling of heaving-shale can be prevented or lessened to a great extent.

In the preparation of drilling mud it is generally desirable to use a finely divided solid which will have a high colloidal dispersion in water so as to produce a viscous, relatively stable mud with a minimum amount of solids. Bentonite has the aforesaid property and has been found to be a particularly satisfactory clay for use in drilling mud. Like other similar clays, bentonite carries a negative electrical charge when colloidally dispersed in an aqueous medium.

It has been found that such negatively charged colloids may be changed to positive colloids by the addition of one or more suitable water soluble chemical compounds from the group: salts of metals wherein the positive valence is three or more, such as thorium, aluminum, cerium and lanthanum salts; acid proteins such as acid gelatin or casein; basic dyes such as methylene blue, methylene green, methylene grey, methyl violet, Bismarck Brown R, Rhodamine B, acriflavine, chrysoidin Y and chrysoidin R. By the addition of one or more of the foregoing matrials, the negatively charged colloidal clay or bentonite may be first neutralized and flocculated and upon a further addition, the neutralized clay may be deflocculated and remain in a stable dispersed state as positively charged particles. It is not desirable to use the flocculated, neutralized particles in drilling mud since these particles are not stably dispersed, the particles readily settling from an aqueous dispersion medium. When such a positively charged clay as, for example, bentonite, is dispersed in water and used as drilling mud, the shale in heaving-shale formations does not swell or slough off into the hole and the bentonite particles remain stably dispersed. The ability of the positively charged bentonite to prevent swelling of the shale is believed to be due to neutralization of the negative charges on the shale particles in the subsurface formation by the positive charges on the bentonite in the drilling mud with resultant formation of a flocculated film of shale and bentonite on the exposed surface of the shale formation in the bore hole. The flocculated material forms an extremely coherent layer and adheres tightly to the surface of the formation, thus substantially preventing further neutralization of charges between the clay of the shale formation and the bentonite in the drilling mud and at the same time substantially preventing the ingress of further water to the formation, thereby preventing hydration and swelling of the heaving shale.

A number of bentonite suspensions were made incorporating acid protein in order to determine the stability of such suspensions. The data obtained on the suspensions is given in the following table:

In the case of mixtures Nos. 38 and 41, the charge of the suspension could not be accurately determined. It will be noted from the table that where the charge was positive the suspensions had good stability, but where the suspension registered no charge the stability was poor and settling occurred. The charge of the suspension was determined by cataphoresis tests.

Drilling muds made in accordance with my invention may contain weighting materials such as barytes and antifoaming agents such as diglycol laurate, and also materials which improved stability, gel strength and filtration characteristics of the mud such as wheat flour and starch.

It is preferred to use water soluble acid gelatin and/or acid casein in quantities somewhat in excess of the quantity required to impart a positive charge to the colloidally dispersed solid particles in the drilling mud. The amount of acid protein required to produce positive charged particles may be readily determined by the Burton apparatus or other similar testing devices.

When two materials of opposite electrical charge react, the amount of each which is affected is inversely proportional to the proportions of replaceable base which is present in a given weight of each material. In view of the variations in the amount of replaceable base in the various dispersed particles, such as bentonitic clays, and in view of the varying degree of effectiveness with which acid gelatin and acid casein impart positive charges to colloidally dispersed particles, it is apparent that the relative quantity used may vary over a rather wide range. The amount of acid casein or acid protein required in each case may be readily determined by a cataphoresis test which should be somewhat in excess of that amount required to impart a positive charge to the dispersed particles. In general the amount of acid casein or acid protein used will fall between the ranges of 1 part of casein or protein to 10 parts of dry bentonite, to 3 parts of casein or gelatin to 1 part of dry bentonite. The casein or gelatin may be mixed with the bentonite in the dry state and the mixture subsequently dispersed in water as required, or they may be added dry or in the dissolved state to mud in which the bentonite is already dispersed.

The term "bentonite" as used herein is used in a generic sense as including all clays having highly colloidal characteristics whether they are true bentonite or not. Acid gelatin and acid protein may be used in the invention, whether or not completely soluble in water so long as they are sufficiently soluble or dispersable in water to produce deflocculated bentonitic mud which is positively charged.

Table

| Mixture No. | Cc. of five percent by wt. of aqueous bentonite suspension | Protein | Cc. of protein solution | Amount of H$_2$O | Stability | Charge |
|---|---|---|---|---|---|---|
| 36 | 1 | 5% acid gelatin solution (pH—3.3) | 40 | Diluted to 100 cc | O. K. | Positive. |
| 37 | 2 | ----do---- | 40 | ----do---- | O. K. | Do. |
| 38 | 4 | ----do---- | 40 | ----do---- | O. K. | |
| 39 | 6 | ----do---- | 40 | ----do---- | Complete settling—12 hrs. | None. |
| 40 | 8 | ----do---- | 40 | ----do---- | ----do---- | Do. |
| 41 | 1 | 2.5% acid casein solution (pH—3.1) | 50 | ----do---- | O. K. | |
| 42 | 2 | ----do---- | 50 | ----do---- | O. K. | Positive. |
| 43 | 4 | ----do---- | 50 | ----do---- | O. K. | Do. |
| 44 | 8 | ----do---- | 50 | ----do---- | 24 cc. settled in 2 hrs | None. |

The protein in each case was made acid by addition of hydrochloric acid. It will be understood, however, that any acid may be used for imparting an acid condition to the protein.

While an effort has been made to explain the theory by which the positively charged colloidal particles in drilling mud provide drilling mud which prevents the heaving of heaving-shale formations, it will be understood that the invention is not to be limited to any particular theory of operation.

It is claimed:

1. In the drilling of earth bores the step of circulating through the bore during the drilling operation an aqueous mud containing positively charged suspended mineral particles to which the positive charge has been imparted by an acid protein selected from the group consisting of acid gelatin and acid casein.

2. In the drilling of earth bores, the step of circulating through the bore during the drilling operation, aqueous mud containing normally negatively charged colloidally dispersed particles and sufficient acid protein selected from the group consisting of acid gelatin and acid casein to impart a positive charge to said particles.

3. In the drilling of earth bores, the step of circulating through the bore during the drilling operation an aqueous mud containing suspended bentonite and weighting material and sufficient acid protein selected from the group consisting of acid gelatin and acid casein to impart a positive charge to the bentonite.

4. A composition for use in well drilling mud comprising comminuted bentonite and an acid protein selected from the group consisting of acid gelatin and acid casein in sufficient quantity to impart a positive charge to the bentonite when suspended in an aqueous medium.

5. A drilling mud comprising an aqueous suspension of normally negatively charged solid particles and sufficient acid protein selected from the group consisting of acid gelatin and acid casein to impart a positive charge to said particles.

6. A drilling mud comprising an aqueous suspension of bentonite and sufficient acid protein selected from the group consisting of acid gelatin and acid casein to impart to the bentonite a positive charge.

7. A drilling mud in accordance with claim 6 containing barite.

8. A drilling mud comprising an aqueous suspension of positively charged solid mineral particles of colloidal size to which the positive charge has been imparted by an acid protein selected from the group consisting of acid gelatin and acid casein.

9. A composition useful in the preparation of drilling muds comprising a mixture of bentonite and acid protein selected from the group consisting of acid gelatin and acid casein, the acid protein being present in amount sufficient to impart to the bentonite particles a positive charge when suspended in water.

10. A composition useful in the preparation of drilling mud comprising comminuted solid particles having a negative charge when suspended in water and sufficient acid protein selected from the group consisting of acid gelatin and acid casein to impart a positive charge to said particles when suspended in water.

11. A drilling mud in accordance with claim 6 contains from 1 part of acid protein to 10 parts of dry bentonite to 3 parts of acid protein to 1 part of dry bentonite.

12. A composition in accordance with claim 9 which contains from 1 part of acid protein to 10 parts of dry bentonite to 3 parts of acid protein to 1 part of dry bentonite.

13. The steps in accordance with claim 3 in which the mud contains an anti-foaming agent and a material which improves the stability, gel strength and filtration characteristics of the mud.

14. A composition in accordance with claim 10 including a weighting material, an anti-foaming agent and a material which improves the stability, gel strength and filtration characteristics of the mud.

DONALD C. BOND.